United States Patent
Schuett et al.

(10) Patent No.: US 12,143,773 B2
(45) Date of Patent: Nov. 12, 2024

(54) METHOD FOR ACTIVATING A GAS, ELECTROTHERMAL GAS ACTUATOR, AND USE OF A GAS ACTUATOR

(71) Applicant: Christian-Albrechts-Universitaet zu Kiel, Kiel (DE)

(72) Inventors: Fabian Schuett, Kiel (DE); Armin Reimers, Kiel (DE); Joerg Bahr, Altenholz-Klausdorf (DE); Lena Marie Saure, Kiel (DE); Florian Rasch, Hamburg (DE); Jannik Rank, Tomesch (DE); Nipon Deka, AE Leiden (NL); Rainer Adelung, Kiel (DE); Soeren Kaps, Schoenkirchen (DE)

(73) Assignee: Christian-Albrechts-Universitaet zu Kiel, Kiel (DE)

( * ) Notice: Subject to any disclaimer, the term of this patent is extended or adjusted under 35 U.S.C. 154(b) by 92 days.

(21) Appl. No.: 17/928,144

(22) PCT Filed: Mar. 19, 2021

(86) PCT No.: PCT/DE2021/100278
§ 371 (c)(1),
(2) Date: Nov. 28, 2022

(87) PCT Pub. No.: WO2021/213577
PCT Pub. Date: Oct. 28, 2021

(65) Prior Publication Data
US 2023/0228261 A1    Jul. 20, 2023

(30) Foreign Application Priority Data
Apr. 21, 2020   (DE) .................. 10 2020 110 746.3

(51) Int. Cl.
*H04R 23/00*     (2006.01)
*F03G 7/06*     (2006.01)
(Continued)

(52) U.S. Cl.
CPC ....... *H04R 23/002* (2013.01); *F03G 7/06114* (2021.08); *F03G 7/0616* (2021.08);
(Continued)

(58) Field of Classification Search
CPC ................................ F03G 7/06–067
(Continued)

(56) References Cited

U.S. PATENT DOCUMENTS

| 5,748,758 | A | * | 5/1998 | Menasco, Jr. | .......... | H04R 23/00 381/174 |
| 5,764,850 | A | | 6/1998 | Olstad et al. | | |

(Continued)

FOREIGN PATENT DOCUMENTS

| CN | 104393165 A | * | 3/2015 |
| CN | 104912760 A | | 9/2015 |

(Continued)

OTHER PUBLICATIONS

Ferdinand Braun: Notiz über die Thermophonie. In: Annalen der Physik und Chemie. Bd. 65, 1898, S. 359, Faksimile der BnF, Source/URL: https:// gallica.bnf.fr/ark:/12148/bpt6k153068/f370.item.langFR# (Year: 1898).*

(Continued)

*Primary Examiner* — Laert Dounis
(74) *Attorney, Agent, or Firm* — Patent Central LLC; Stephan A. Pendorf (57) ABSTRACT

A method for activating a gas, wherein an electrically conductive aeromaterial having a pore space comprising the gas is electrically contacted and at least one electric current, which varies over time, flows through the aeromaterial, wherein the aeromaterial exhales gas from the pore space when the electrical power consumption is increased and inhales gas from the surroundings of the aeromaterial when the power consumption is decreased, and wherein a tempo- (Continued)

rally pulsed current having predefined pulse power levels, pulse durations and pulse spacings is fed through the aeromaterial and the temperature of the aeromaterial is changed by the time-varying current by 100° C. or more within one second or less. The invention also relates to an electrothermal gas actuator and to uses of a gas actuator.

8 Claims, 5 Drawing Sheets (51) Int. Cl.
H05B 1/02 (2006.01)
H05B 3/12 (2006.01)
(52) U.S. Cl.
CPC ........... F03G 7/062 (2021.08); F03G 7/0646 (2021.08); F03G 7/066 (2021.08); H05B 1/0227 (2013.01); H05B 3/12 (2013.01); H05B 2214/04 (2013.01)
(58) Field of Classification Search
USPC ........................................................ 381/164
See application file for complete search history.

(56) References Cited

U.S. PATENT DOCUMENTS

| 2014/0162001 A1 | 6/2014 | Schulte et al. |
| 2016/0057814 A1 | 2/2016 | Klett et al. |
| 2019/0072327 A1 | 3/2019 | Kisner et al. |

FOREIGN PATENT DOCUMENTS

| EP | 2550241 A1 | 1/2013 |
| JP | 2012205193 A | 10/2012 |
| WO | 2017091790 A1 | 6/2017 |
| WO | 2018026267 A1 | 2/2018 |

OTHER PUBLICATIONS

Wenwen Fei, et al.: "Low-voltage Driven Graphene Foam Thermoacoustic Speaker", Small May 1, 2015 Wiley—ISSN 1613-6810, vol. 11, No. 19, May 1, 2015 (May 1, 2015), pp. 2252-2256, http://dx.doi.org/10.1002/smll.201402982, XP055363771.

Guiraud Pierre, et al.: "Two temperature model for thermoacoustic sound generation in thick porous thermophones", Journal of Applied Physics, Oct. 28, 2019 American Institute of Physics, 2 Huntington Quadrangle, Melville, NY 11747—ISSN 0021-8979, vol. 126, No. 16, p. 165111, http://dx.doi.org/10.1063/1.5121395, XP055811859.

Schaedler T. A., et al.: "Ultralight Metallic Microlattices", American Association for the Advancement of Science, Science, Nov. 18, 2011, US—ISSN 0036-8075, vol. 334, No. 6058, pp. 962-965, http://dx.doi.org/10.1126/science.1211649962-965, XP055775404.

Wei Wang, et al.: "Three dimensional few layer graphene and carbon nanotube foam architectures for high fidelity supercapacitors", Nano Energy, 2013, Elsevier, NL—ISSN 2211-2855, vol. 2, No. 2, pp. 294-303, http://dx.doi.org/10.1016/j.nanoen.2012.10.001, XP055383830.

International Search Report issued on Jun. 21, 2021, in International Application No. PCT/DE2021/100278.

* cited by examiner

METHOD FOR ACTIVATING A GAS, ELECTROTHERMAL GAS ACTUATOR, AND USE OF A GAS ACTUATOR

BACKGROUND OF THE INVENTION

Field of the Invention

The invention relates to a method for activating a gas, wherein
an electrically conductive aeromaterial having a pore space comprising the gas is electrically contacted
and
at least one electric current, which varies over time, flows through the aeromaterial,
wherein
the aeromaterial exhales gas from the pore space when the electric power consumption is increased and inhales gas from the surroundings of the aeromaterial when the power consumption is decreased.

Furthermore, the invention relates to an electrothermal gas actuator and uses of a gas actuator.

Description of the Related Art

The present description understands gas activation as the increase of the kinetic energy of the molecules of a gas. In this broad definition, blowers, gas pumps, fans, but also heating wires or hotplates are all devices for gas activation, hereinafter referred to as gas actuators for short. Usually, gas actuators convert electrical energy into thermal and/or mechanical energy and transfer this at least partially to a gas surrounding the gas actuator (ambient gas).

Sometimes the metering problem arises, for example when one wants to release a small, precisely defined amount of gas through an outlet valve, or also when one must ensure that a precisely measured amount of energy is supplied to a gas volume. It is useful to have a gas actuator available that can activate arbitrarily scalable volumes of gas from liters to nanoliters with precisely selectable amounts of energy, and also repeat this as often as desired with a high repetition rate.

A method and apparatus providing these capabilities are described below for the first time.

Among the new classes of materials that have emerged in the last decade are the so-called aeromaterials. These are characterized by a three-dimensionally cross-linked, open-pored structure of nano- to microscale—not necessarily always straight—rods or tubes. The rods or tubes usually have an aspect ratio (length:diameter) of five or more and are typically firmly connected to neighboring rods or tubes only at points and tilted against each other. The connections can be formed, for example, by metal fusion, crystal interpenetration or covalently. Some aeromaterials form a shape-elastic network that returns to its original shape after temporary deformation.

Some aeromaterials show good electrical conductivity. Common properties of all aeromaterials are:
a porosity greater than 90%, usually greater than 95%, if hollow tubes form the network, even greater than 99%;
a very low mass density between about 0.2 and 200 mg/cm$^3$;
a connected network, i.e. from every point of the network a path leads to every other point without leaving the material;
the large pore space is open and fully connected, in particular, an ambient gas can pass through the pore space and the entire network without significant obstruction.

The expert knows aeromaterials so far mainly from scientific publications, e.g.

Schaedler, T. A.; Jacobsen, A. J.; Torrents, A.; Sorensen, A. E.; Lian, J.; Greer, J. R.; Valdevit, L.; Carter, W. B. "Ultralight Metallic Microlattices." Science. 334 (6058): 962-5 (2011).

Gordon, L. M.; Bouwhuis, B. A.; Suralvo, M.; McCrea, J. L.; Palumbo, G.; Hibbard, G. D. "Micro-truss nanocrystalline Ni hybrids". Acta Materialia. 57: 932-939 (2009).

Wang, W. et al; "Three dimensional few layer graphene and carbon nanotube foam architectures for high fidelity supercapacitors". Nano Energy 2, 294-303 (2013).

U.S. Pat. No. 10,071,912 B2 describes an aerocarbon (aerokohlenstoff) produced by deposition of carbon from the gas phase on a template of crosslinked tetrapodal zinc oxide (T-ZnO, see EP 25 50 241 B1). In this process, a closed network of carbon forms on the surfaces of the ZnO tetrapods, and after chemical dissolution of the template, the shape-elastic network of covalently bonded hollow carbon tubes remains. This material, known as aerographite, was at times the lightest material in the world at about 0.2 mg/cm.$^3$ Recently, a significantly simplified method for aerocarbon (aerokohlenstoff) fabrication has become available from the work of Rasch et al, "Wet-Chemical Assembly of 2D Nanomaterials into Lightweight, Microtube-Shaped, and Macroscopic 3D Networks," ACS Applied Materials & Interfaces 2019 11 (47), 44652-44663, DOI: 10.1021/acsami.9b16565. In this process, an aqueous dispersion containing electrochemically exfoliated graphene flakes is dropped onto a prefabricated cylinder of crosslinked T-ZnO, and a closed layer of graphene self-assembles on the ZnO surface. After removal of the T-ZnO, a completely black cylinder of aerographene (aerographen) remains, and its electrical and mechanical properties are being investigated by Rasch et al.

Further, from FEI, WENWEN; ZHOU, JIANXIN; GUO, WANLIN: Low-voltage Driven Graphene Foam Thermoacoustic Speaker. small 2014, DOI: 10.1002/smll.201402982, a thermophone made of a graphene foam molded body with 1 cm$^2$ footprint, which is electrically contacted and applied with a sinusoidal AC current, is known.

Intelligent actuators are known from the publication CN 104 912 760 A, concerning in particular a thermopneumatic actuator based on conductive foam and a process for its manufacture, wherein the electrothermal actuator can realize the conversion of electrical energy into mechanical energy and its operating principle consists in first converting electrical energy into thermal energy through an electrothermal material, which causes the actuating material to expand and deform under the action of heat, which in turn leads to an actuation phenomenon. The invention sets itself the task of demonstrating a method and a device for gas activation of defined volumes with defined amounts of energy by means of aeromaterials.

BRIEF SUMMARY OF THE INVENTION

The task is solved by a method according to the main claim and subsidiary claims. Further advantageous embodiments are to be taken from the subclaims.

The method according to the invention for activating a gas is characterized in that an electrically conductive aeromaterial having a pore space comprising the gas is electrically contacted and at least one electric current, which varies over time, flows through the aeromaterial,
wherein
the aeromaterial exhales gas from the pore space when the electric power consumption is increased and inhales gas from the surroundings of the aeromaterial when the power consumption is decreased,
wherein
a time-varying pulsed current having predetermined pulse power levels, pulse durations and pulse spacings is fed through the aeromaterial
and
the temperature of the aeromaterial is changed by the time-varying current by 100° C. or more within one second or less.

Electrically conductive aeromaterials can be formed from electrically conductive elements such as carbon or from a metal. In the presence of an interconnected network—in the presence of percolating current paths—the electrical contacting of the aeromaterial usually proves to be unexpectedly simple. It is often sufficient to contact any two separate points of the aeromaterial, and the activated current flow between these two points takes virtually any possible path through the material. This results in uniform ohmic heating of the entire aeromaterial network. The reason for this is the increase in resistance typically associated with heating, so that the current always preferentially takes the coolest path in the extreme "parallel connection" of the conductive network. Since all paths heat up very quickly, the heating occurs almost everywhere simultaneously.

Even when energized with low electrical powers of a few watts, the heating of the aeromaterial can amount to several 100° C. The final temperature can be approximately reached in less than one second.

Aeromaterials transfer thermal energy excellently to gases, but not to liquids or solids. The reason for this is the very low specific heat capacity of aeromaterials, which—like the mass density—is in the range of orders of magnitude usual for gases. Temperature increases in aeromaterials can therefore only be determined without contact by measuring the thermal radiation. According to the invention, it is intended to supply a locally limited quantity of gas with an amount of energy that is known as precisely as possible.

In particular, guided activation of the gas is carried out in a particularly preferred manner by arranging the aeromaterial in the form of a molded body in a housing with gas inlet and gas outlet and check valves. When sound waves propagate, the activated gas passes the energy to adjacent gas volumes by impact processes. If the energy transfer is prevented by a housing surrounding the aeromaterial, then the gas supplied to the aeromaterial through a gas inlet into the housing is activated directly and expelled from the housing in a directed manner, for example through a gas outlet, which in particular forms the basis for a pumping unit, most especially in the form of a micro-metering pump. An appreciable amount of the activated gas is subjected to considerable local displacement during pumping, which in turn is then to be in a predetermined direction. The provided means of constraint for the activated gas is the surrounding housing, which additionally preferably has check valves as mechanical closures. The flow of the aeromaterial must or at least should be obviously adapted to the mechanical switching speed of the valves.

In order for the pumping unit to be able to activate appreciable gas flows even with pulsed current at a low repetition rate, each individual current pulse should or must activate a well-defined gas volume and cause it to move, which is achieved here by the high pulse current powers in the range of a few watts to over 100 watts. These lead to temperature changes in the aeromaterial of more than 100° C. and thus to activation of the entire gas present in the pore space. Therefore, the disclosure takes a significantly different approach than the prior art, in which usually only powers of 0.1 W are run (cf. e.g. Fei et al.—No information is given on temperature changes of the aeromaterial, but it may be assumed that these are likely to be less than 100° C. in the D1 due to the lower power and the kilohertz oscillation).

The essential finding of the invention, reported here for the first time, may therefore be:

a. The gas in the pore space takes over the temperature of the material, which rises due to the current, almost immediately and expands approximately in accordance with Gay Lussac's law (V/T=constant). A proportion of the gas leaves the aeromaterial, and usually even with a small, audible bang when the flow rate increases rapidly. The aeromaterial exhales when the electrical power increases.

b. If the current is deactivated or the electrical power is reduced, cooler ambient gas immediately flows into the pore space and the aeromaterial gives off heat to this gas. In this case, the aeromaterial inhales ambient gas.

c. An aeromaterial heated to high temperatures, e.g. 1000° C. and more, cools down again to its initial temperature before the start of the current flow in a very short time after the current flow is switched off. The cooling time can be less than one second.

The electrically controllable exhalation/inhalation of the conductive aeromaterial, which can be called "electrothermal respiration" with some justification, also becomes technically usable through feature c, because this allows technically relevant repetition rates.

It is considered particularly advantageous that a temporally pulsed current with predetermined pulse heights, pulse durations and pulse spacings is passed through the aeromaterial. With each of the current pulses, a defined energy—namely the predetermined electrical power multiplied by the predetermined current pulse duration—is transferred to a defined quantity of gas—namely the volume of the pore space of the aeromaterial being energized. The gas expansion and displacement from the pore space is defined accordingly for each current pulse.

Gas activation occurs practically only in the pore space and thus exactly at that place in a gas-filled volume where the aeromaterial is located.

According to the invention, the electrothermal gas actuator for gas activation of defined volumes with defined amounts of energy by means of aeromaterials comprises:
an electric current source,
a control device designed to control the current source according to a method disclosed and claimed herein in accordance with the invention,
a shaped body made of an electrically conductive aeromaterial, wherein the shaped body has open-pored sides with accesses for a gas and/or ambient gas to the pore space of the aeromaterial and is contacted for electrical energization, wherein the electrically conductive aeromaterial is an aerocarbon (aerokohlenstoff) or aerographene, and wherein the volume of the pore space of the shaped body has a value from the interval of 1 nanolitre to 1 liter.

First of all, a shaped body means a geometric body—e.g. cube, cylinder, sphere. In the context of this description, the shaped body of an open-pore network is a real physical object, namely an aeromaterial brought into a specific geometric shape. The sides of the shaped body coincide with the edge extensions of the network, i.e. they form the envelope of the network. The true internal surface area of the aeromaterial exceeds the total surface area of the sides of the geometric shaped body by orders of magnitude.

The shape of the molded body can be predetermined, for example and preferably for aerocarbon (aerokohlenstoff), by means of a molded body made of T-ZnO. It can also be achieved by means of precise laser cutting of the aerocarbon (aerokohlenstoff), because aerocarbon (aerokohlenstoff) absorbs light very well.

For example, T-ZnO templates and, if necessary, subsequent laser processing can be used to produce shaped bodies from aerographene with a volume between preferably 1 nanolitre and 1 liter. With a typical porosity of aerographene of more than 99%, the volume of the molded body corresponds approximately to the volume of its pore space and thus to the volume of the gas activated by a single current pulse.

The unique ability of aeromaterials to perform electrothermal gas activation in well-defined doses at high repetition rates when needed suggests several new applications, described below.

BRIEF DESCRIPTION OF THE SEVERAL VIEWS OF THE DRAWINGS

The invention is first explained in further detail with reference to an embodiment of a gas actuator with a molded aerographene body, and with reference to figures. Thereby shows.

DETAILED DESCRIPTION OF THE INVENTION

An experimental set-up with a shaped body of aerographene contacted for current flow has already been described in the work of Rasch et al. It is useful for the realization of the gas actuator proposed here. However, Rasch et al. do not make any statements on the ambient gas, on the temperatures of the shaped body or on a pulsed current flow. Only a conductance determination is made, from which it can be concluded that aerographene according to the manufacturing process described there have percolating current paths above a density of 1 mg/cm.$^3$ In the following, for abbreviation purposes, a molded body made of aerographene is always meant by way of example. It can be assumed that all electrically conductive aeromaterials exhibit qualitatively similar behavior, although there are of course differences between carbon networks and metallic microgrids which must be taken into account appropriately in individual cases. For example, aerocarbon (aerokohlenstoff) can be heated to more than 3000° C. in a chemically inert ambient gas without damage, which is more likely to be avoided for the microgrids. For the purposes of the gas actuator presented here, however, these differences are considered insignificant because extreme conditions are not required.

The energized molded part can be observed with a pyrometer and/or thermal imaging camera to determine its temperature from thermal radiation.

Figure 1:
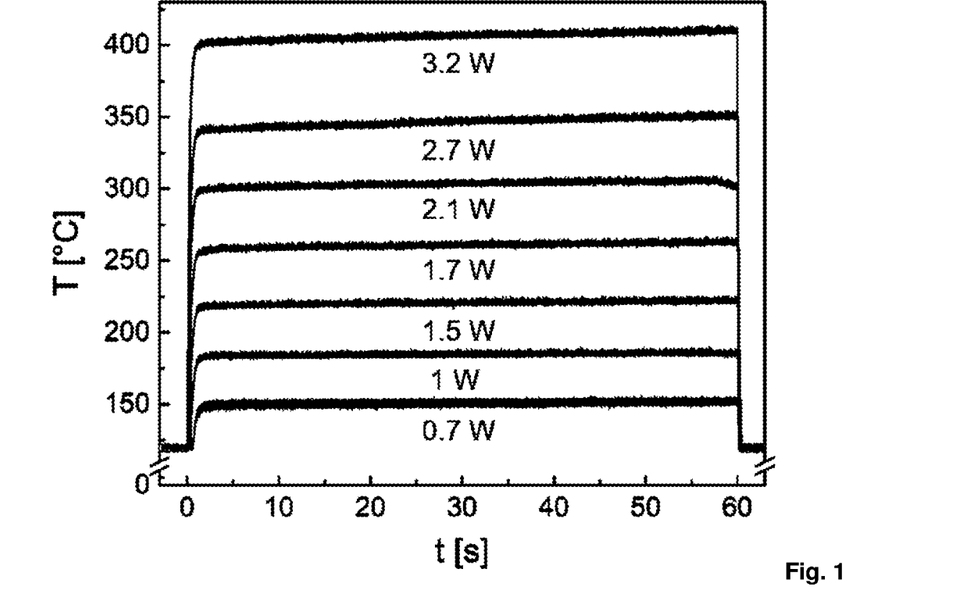
FIG. 1 Pyrometrically measured temperature curves and final temperatures of the molded body from aerographene for different electrical powers of energization of the molded body.

FIG. 1 shows a set of pyrometrically recorded temperature measurement data in which a molded part is heated to different temperature levels. The decisive factor for the extent of heating is the applied electrical power, as can be seen from the figure. The molded body reaches its final temperature when its energy absorption from the ohmic resistance when energized equilibrates with its energy losses from radiation and gas convection in the pore space. FIG. 1 clearly shows that the final temperature is approximately reached after less than one second. Cooling occurs almost as quickly when the power is removed, even from the equilibrated—i.e. not only briefly heated—state. Temperature increases of more than 100° C. can be achieved with just a few watts of power.

Figure 2:
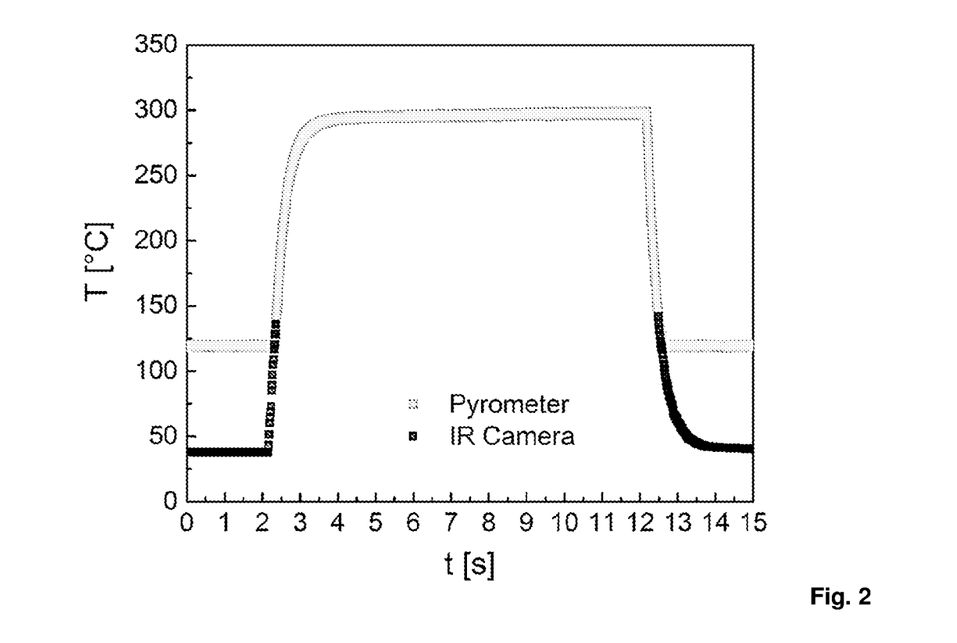
FIG. 2 one of the plots as in FIG. 1 acquired in parallel with a pyrometer and an IR camera.

The base level of the temperature in FIG. 1 is about 120° C., but this is an artifact of the measurement. Temperatures below this can no longer be detected with the pyrometer. In FIG. 2, therefore, a temperature curve as in FIG. 1 has been recorded simultaneously with the pyrometer and with an IR camera, the camera having a larger measuring range. It can be seen from FIG. 2 that the return of the molded part to the ambient temperature actually takes place very quickly within about 1-2 seconds. This amazingly efficient cooling behavior of aeromaterials after ohmic heating has never been reported before to the knowledge of the inventors and shall be exploited here.

Figure 3:
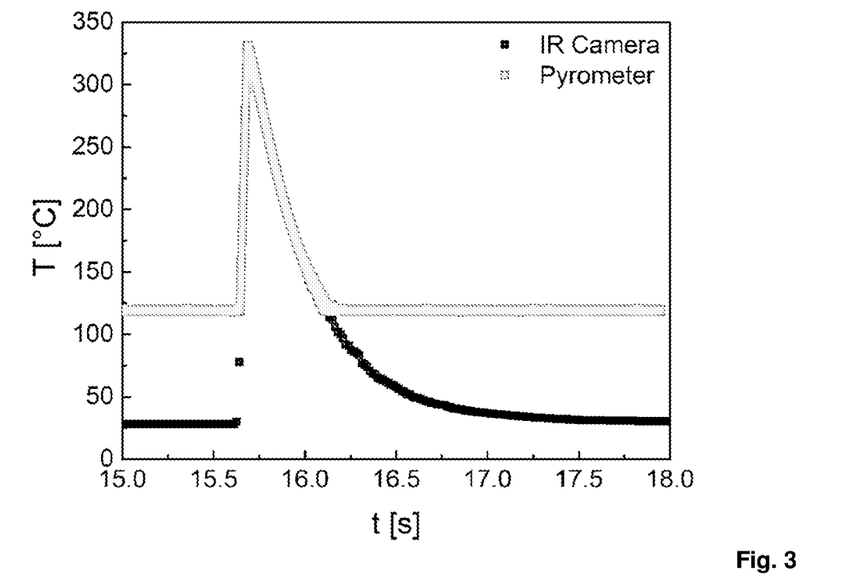
FIG. 3 shows the temperature profile of the molded part during a current pulse of 15 W for a pulse duration of 60 ms recorded with a pyrometer and IR camera.

According to the invention, it is intended to allow time-variable currents, preferably current pulses with predetermined pulse powers, pulse durations and pulse spacings, to flow through aeromaterials, in particular shaped bodies of aeromaterials. For example, FIG. 3 shows the temperature curve of the said shaped body of aerographene for a current pulse of pulse power 15 W at a pulse duration of 60 ms. For clarification, the pulse power is, as usual, the product of voltage applied to the molded body and current generated in the molded body, and the pulse energy is the product of pulse power and pulse duration. The pulse energy can be varied by varying the pulse power and/or pulse duration. The pulse interval is the time interval between the onset of a first current pulse and the onset of a second current pulse immediately following in time the end of the first current pulse, regardless of the pulse duration. In a sequence of more than two current pulses, the pulse spacing may change over the course of the sequence.

From the comparison of FIG. 3 with FIG. 1, it is clear that the short pulse duration causes the heating of the molded part to stop long before a final temperature is reached (above 1000° C. for 15 W), i.e. still in the rising flank. It is also clear that the IR camera has measurement dynamics that are too slow to capture the rising temperature slope at higher pulse powers. Therefore, in the following only measurement data of the much faster pyrometer are shown with reference to the mentioned measurement artifact at 120° C.

Figure 4:
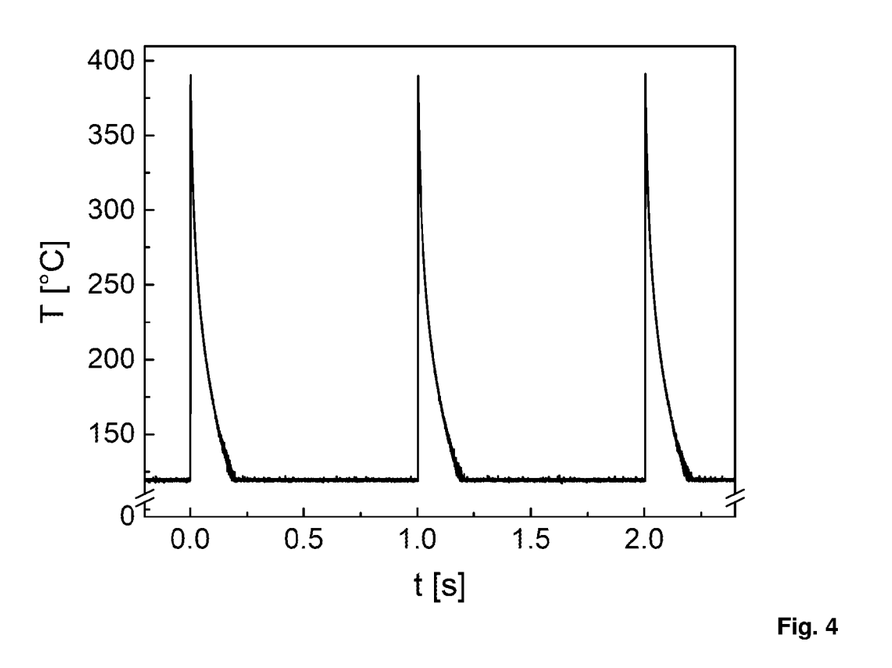
FIG. 4 shows the pyrometrically measured temperature profile of the molded part during a sequence of current pulses of 109 W with pulse durations of 1.7 ms.

In order to achieve a very steep heating edge, each current pulse of a sequence of pulses with a power of 109 W is applied for a pulse duration of 1.7 ms in the measurement data of FIG. 4. The cooling edge requires about 200 ms each (until leaving the pyrometer measuring range). With an exemplary selected current pulse interval of 1 s, a sequence of similar temperature curves can be produced.

It is considered generally advantageous to carry out pulsed energization of the aeromaterial in such a way that the pulse intervals are set up to be at least one order of magnitude greater than the pulse durations. In this way, a repetitive operation of the gas actuator can be ensured, i.e. each "breath" of the gas actuator has a clearly predictable effect on the gas. The gas actuator returns to its initial state after each pulse before the next pulse is applied.

Figure 5:
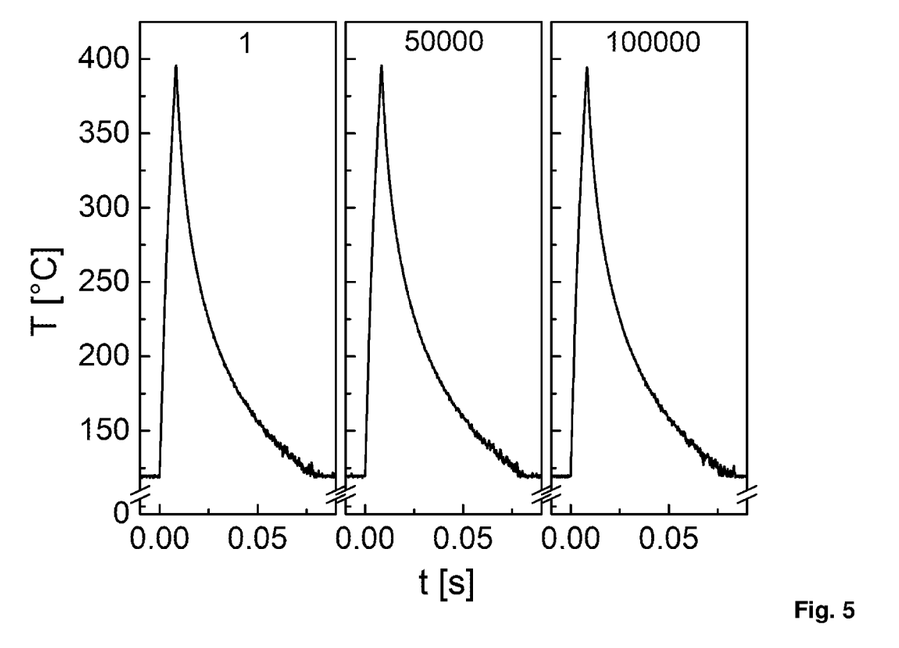
FIG. 5 shows the temperature profile of the molded part during a first current pulse of 7 W for a pulse duration of 10 ms in comparison with the temperature profiles after a further 50,000 or 100,000 applied current pulses with the same pulse parameters.

FIG. 5 shows the temperature profile of the molded part during a first current pulse of 7 W for a pulse duration of 10 ms compared with the temperature profiles after a further 50,000 or 100,000 applied current pulses with the same pulse parameters. The pulse parameters were specifically selected here to heat the molded part to 400° C. each time. Thermal cycling recognizably does not affect the molded part, i.e. long sequences of current pulses are also possible and harmless.

Figure 6:
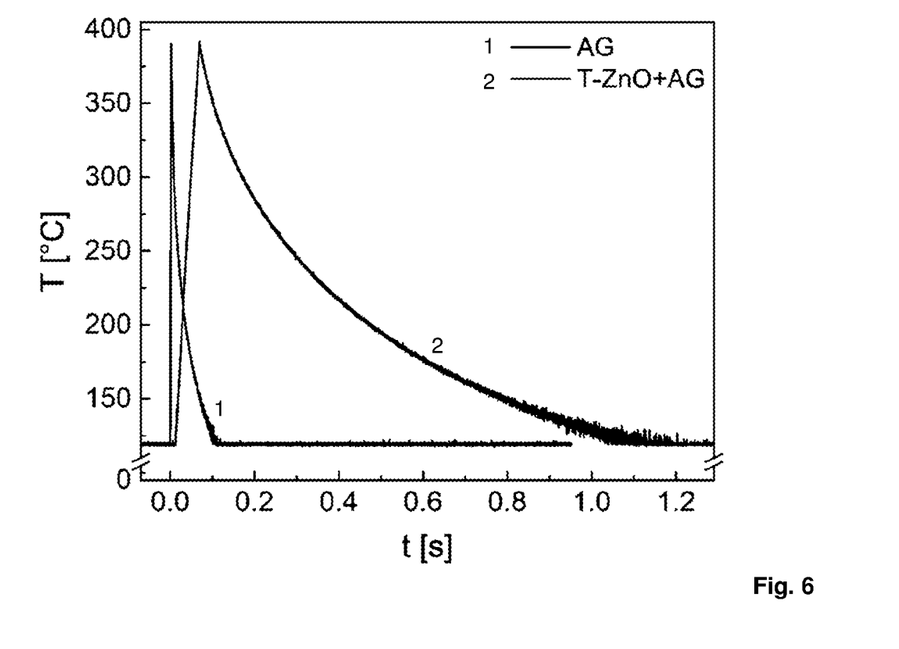
FIG. 6 the pyrometrically measured temperature profiles for a template of T-ZnO coated with graphene compared to the temperature profile of the remaining aerographene after removal of the T-ZnO.

FIG. 6 shows how important the low mass density and heat storage capacity of the aeromaterial are for its rapid cooling behavior. The curve labeled T-ZnO+AG represents the temperature profile of a T-ZnO template coated with exfoliated graphene flakes according to Rasch et al. When current is applied to the template, the current flows almost only through the graphene sheets, but the amount of heat generated is also transferred to the T-ZnO, where it is better stored. When the current is turned off, cooling below the measurement limit of the pyrometer takes more than a second, even though the crystalline T-ZnO is not a good heat storage material and itself has a density of only slightly more than 300 mg/cm$^3$. The curve labeled AG shows, for identical current pulse parameters, the temperature profile of the same graphene layers after chemical dissolution of the T-ZnO, i.e. now as aerographene with a density of 4 mg/cm$^3$. The cooling rate has increased by a whole order of magnitude.

It should be noted that the measurement data in FIGS. 1 to 5 were determined with aerographene of a mass density of 8 to 10 mg/cm$^3$, which can be seen from the somewhat lower cooling rate compared with the aerographene in FIG. 6. As a rule of thumb, lower mass density is associated with faster cooling. The physical lower limit of the mass density is considered to be 0.2 mg/cm$^3$, because below this level it is no longer possible to realize a coherent network for uniform flow. Technically, mass densities above 1 mg/cm$^3$ are also preferable for reasons of mechanical properties.

The temperature characteristics of a molded body made of an aeromaterial, preferably of an aerocarbon (aerokohlenstoff), particularly preferably of aerographene, shown so far are all associated with gas activation in the pore space of the aeromaterial. As mentioned earlier, the molded body can exhale and inhale in time with its time-varying current flow; in a sense, it behaves like an electric bellows, but without moving parts.

Thus, it is sufficient to add, for example, a control device for controlling the current source to the structure of Rasch et al. in order to arrive at a gas actuator according to the invention. The control device may be formed by a conventional microprocessor or PC, which issues programmed control commands to the current source for activation, deactivation or power control. The control device may be designed to allow user-selectable current pulse parameters to be implemented by the current source. The control device may read control commands from stored tables and execute them at predetermined times. In addition or alternatively, the control unit can also receive and process other measurement data and use it to issue control commands.

Figure 7:
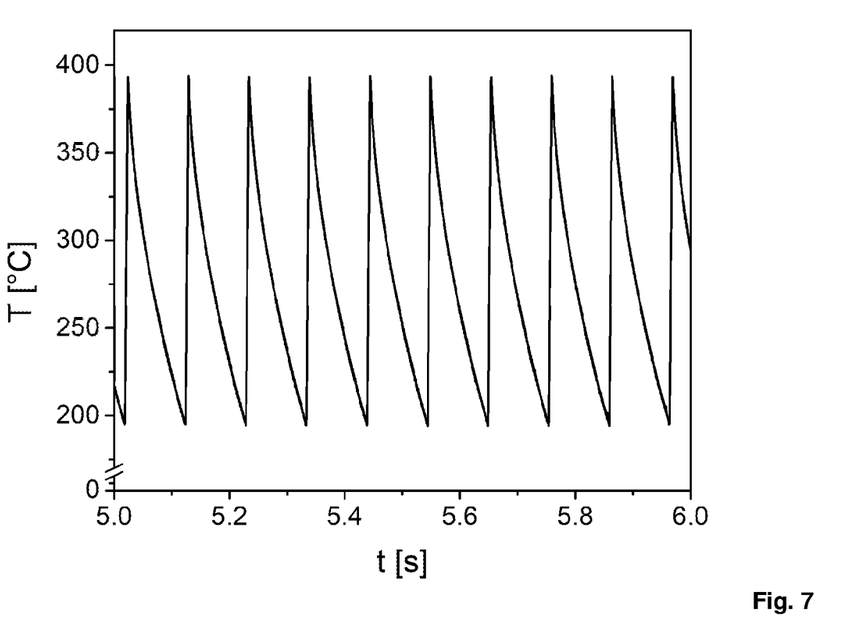
FIG. 7 shows the pyrometrically measured temperature profile of the molded part made of aerographene during a temperature-timed pulse streaming with a frequency of approx. 10 Hz.

An example of feedback operation of the gas actuator may be to set a minimum pumping or breathing rate to the gas actuator with the proviso that it should ensure uniform exhalation and inhalation. To this end, the temperature of the gas actuator's molded body is monitored with a pyrometer, and the pyrometer measurement data is fed to the control device. The control device can then, for example, use the temperature curve to determine times at which it triggers further current pulses in order to generate uniform temperature cycles at the specified minimum frequency. Such a procedure generates an exemplary temperature curve as shown in FIG. 7, where a minimum frequency of 10 Hz is realized.

The control device can also vary the power and/or duration of repeated current pulses, adjusting to accurately achieve a fixed prescribed breathing rate and maintain uniformity of heating of the molded body for all pulses.

Although the cooling of the molded body—associated with its inhalation—is the slower process in gas activation, its speed can nevertheless also be influenced. In particular, it can be advantageous if a non-zero, time-constant current is superimposed on the time-varying current through the molded body. This has the effect that the molded body is basically at an elevated temperature relative to the ambient gas, so that its cooling by inhalation of ambient gas is faster. As a result, one sets oneself to a different operating point of the cooling curve. As a rule of thumb, the greater the temperature elevation of the molded part compared to the ambient temperature, the higher the breathing frequencies that the gas actuator can realize.

Preferably, it is provided that the temporal change of the current through the molded body is carried out with a frequency of 10 Hz or more. Particularly preferably, however, frequencies in the range greater than 100 Hz or even greater than 1 kHz are also realized. It is not always necessary for the temperature fluctuations of the molded body to be as pronounced as shown in the previous examples. Even less than 100° C. temperature variation produces gas activation, and at said frequencies the gas actuator then emits audible sound waves. A very interesting possible application of the gas actuator according to the invention is therefore seen in its use as a sound emitter or loudspeaker—also for the reproduction of speech or music. In principle, the radiation characteristic can be omnidirectional, or at least less restricted than in conventional loudspeakers. Moreover, the gas actuator is basically very small and space-saving.

Another application tested in the laboratory is to use the gas actuator, already understood as a bellows, directly as a pumping unit of a micro-metering pump for gases. For this purpose, the gas actuator can be arranged in a closed housing with a gas inlet and a gas outlet, both equipped with check valves. During electrothermal exhalation, the gas actuator generates an overpressure in the housing, and the gas outlet alone opens and allows a gas component to escape. During inhalation, a negative pressure is generated in the housing, which is compensated by the sole opening of the gas inlet. A sequence of current pulses thus conveys a precisely determinable quantity of gas through the housing and into a tube or the like arranged on the outlet side. By selecting the current pulse intervals, i.e. the repetition rate, the pump speed can be set up.

Under the impression of the Corona Pandemic 2020, one very important and forward-looking application of the gas actuator according to the invention is in air purification, particularly for destroying organic structures and microorganisms, such as viruses and fungal spores, which are also moved in the ambient air. In fact, it may even be assumed to be particularly effective here without any appreciable environmental pollution, which is especially important for use in hospitals.

Just like the gas molecules, entrained organic flight particles are inhaled into the pore space of the gas actuator's molded body during the repetitive pulsed current, where they are abruptly exposed to temperatures that reliably denature any biological organics. In this application, it is considered particularly advantageous if the temperature of the aeromaterial is changed by the time-varying current by 100° C. or more, preferably 300° C. or more, within one second or less. The remains thus destroyed or killed are largely exhaled, and if any remains do remain in the pore space, they can be thermally decomposed and outgassed by an occasional "service current pulse" that brings the molded body to a very high temperature for a short time. At the same time, it can be avoided that the room air as a whole experiences a noticeable heating, since the gas actuator usually supplies it with only a few joules of energy per second.

Experimental tests show that heating rates of 100,000° C. per second and more can easily be achieved. However, if a large volume of a molded part is heated up too quickly, the heated gas in the pore space can only escape quickly enough by blowing off parts of the molded part. It is therefore advisable to set up a limitation of the electrical power as a function of the volume of the aeromaterial being energized.

Figure 8:
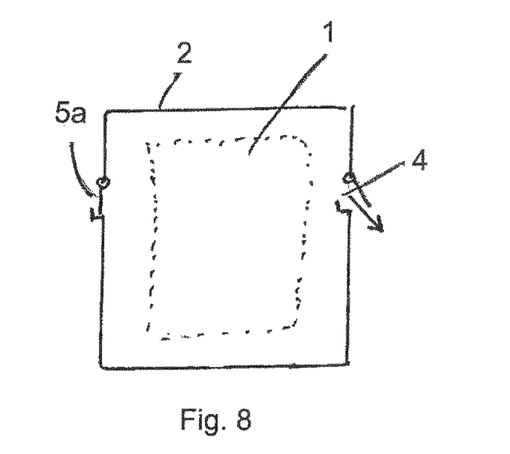
FIGS. 8 and 9 show guided activation of a gas by arranging the aeromaterial in the form of a molded body in a housing.
Figure 9:
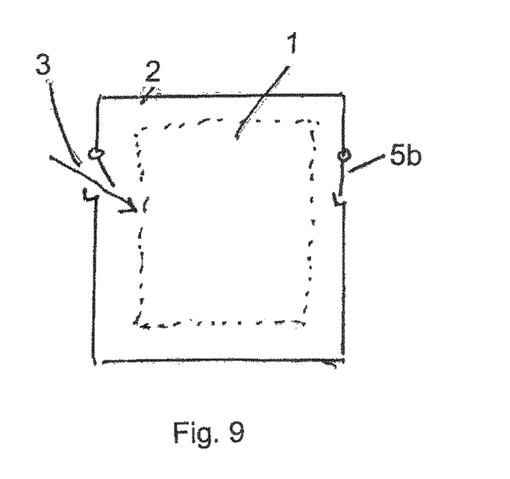

Guided activation of the gas is carried out in a particularly preferred manner by arranging the aeromaterial in the form of a molded body 1 in a housing 2 with gas inlet 3 and gas outlet 4 and check valves 5a, 5b. When sound waves propagate, the activated gas passes the energy to adjacent gas volumes by impact processes. If the energy transfer is prevented by a housing 2 surrounding the aeromaterial, then the gas supplied to the aeromaterial through a gas inlet 3 into the housing is activated directly and expelled from the housing in a directed manner, for example through a gas outlet 4, which in particular forms the basis for a pumping unit, most especially in the form of a micro-metering pump. An appreciable amount of the activated gas is subjected to considerable local displacement during pumping, which in turn is then to be in a predetermined direction. The provided means of constraint for the activated gas is the surrounding housing 2, which additionally preferably has check valves 5a, 5b as mechanical closures. The flow of the aeromaterial must or at least should be obviously adapted to the mechanical switching speed of the valves.

The invention claimed is:

1. A method for activating a gas, comprising
   electrically contacting an electrically conductive aeromaterial having a pore space comprising the gas, the electrically conductive aeromaterial having a porosity of more than 99%, and
   flowing at least one electric current, which varies over time, through the electrically conductive aeromaterial,
   wherein the electrically conductive aeromaterial exhales gas from the pore space when an electric power consumption is increased and inhales gas from the surroundings of the electrically conductive aeromaterial when the power consumption is decreased,
   wherein
   a time-varying pulsed current having predetermined pulse power levels, pulse durations and pulse spacings is fed through the aeromaterial
   the temperature of the electrically conductive aeromaterial is changed by the time-varying current by 100° C. or more within one second or less, and
   the pulse intervals are set up at least one order of magnitude greater than the pulse durations.

2. The method according to claim 1, wherein a current, constant in time and different from zero, is superimposed on the current, that varies with time.

3. The method according to claim 1, wherein the variation in time of the current is performed at a frequency of 10 Hz or more.

4. A method for activating a gas, comprising
   electrically contacting an electrically conductive aeromaterial having a pore space comprising the gas, the electrically conductive aeromaterial having a porosity of more than 99%, and
   flowing at least one electric current, which varies over time, through the electrically conductive aeromaterial,
   wherein the electrically conductive aeromaterial exhales gas from the pore space when an electric power consumption is increased and inhales gas from the surroundings of the electrically conductive aeromaterial when the power consumption is decreased,
   wherein
   a time-varying pulsed current having predetermined pulse power levels, pulse durations and pulse spacings is fed through the electrically conductive aeromaterial
   the temperature of the electrically conductive aeromaterial is changed by the time-varying current by 100° C. or more within one second or less, and
   a guided activation of the gas is performed by arranging the electrically conductive aeromaterial in the form of a shaped body in a housing with gas inlet and gas outlet and check valves.

5. An electrothermal gas actuator for gas activation of defined volumes with defined energy quantities by means of electrically conductive aeromaterials, comprising:
   an electric current source,
   a control device set to control the electric current source to feed a time-varying pulsed current having predetermined pulse power levels, pulse durations and pulse spacings through the electrically conductive aeromaterial and change the temperature of the electrically conductive aeromaterial by the time-varying current by 100° C. or more within one second or less
   a shaped body made of an electrically conductive aeromaterial, wherein the shaped body has open-pored sides with accesses for a gas and/or ambient gas to the pore space of the electrically conductive aeromaterial and is contacted for electrical energization, wherein the electrically conductive aeromaterial is an aerocarbon or aerographene, the volume of the pore space of the shaped body has a value from 1 nanolitre to 1 liter, and the pulse intervals are set up at least one order of magnitude greater than the pulse durations.

6. A pumping unit of a micro-metering pump for gases comprising the gas actuator according to claim 5.

7. A device for destroying organic structures and microorganisms entrained in ambient air comprising the gas actuator according to claim 5.

8. An emitter of audible sound or a loudspeaker comprising the gas actuator according to claim 5.

\* \* \* \* \*